United States Patent [19]

Horowitz et al.

[11] Patent Number: 4,642,079

[45] Date of Patent: * Feb. 10, 1987

[54] TRANSMISSION CHAIN

[75] Inventors: Alexandre Horowitz; Martinus H. Cuypers, both of Eindhoven; Jacobus H. M. van Rooji, Nuenen, all of Netherlands

[73] Assignee: Volvo Car B.V., Netherlands

[ * ] Notice: The portion of the term of this patent subsequent to Jun. 29, 1999 has been disclaimed.

[21] Appl. No.: 356,750

[22] Filed: Mar. 10, 1982

[30] Foreign Application Priority Data

Mar. 10, 1981 [NL] Netherlands ..................... 81 01166
Jun. 15, 1981 [NL] Netherlands ..................... 81 02868
Nov. 9, 1981 [NL] Netherlands ..................... 81 05056

[51] Int. Cl.⁴ ............................................. F16G 13/02
[52] U.S. Cl. .................................... 474/219; 474/206; 474/240; 474/246
[58] Field of Search ............... 474/206, 207, 219, 220, 474/221, 223, 226, 227, 228, 229, 230, 240, 246, 247

[56] References Cited

U.S. PATENT DOCUMENTS

| 12,912 | 1/1909 | Morse | 474/217 |
| 259,137 | 6/1882 | Hall | 474/247 |
| 1,159,163 | 11/1915 | Best | 474/229 |
| 1,727,129 | 1/1926 | Morse | 474/220 |
| 1,898,035 | 2/1933 | Diamond | 474/242 |
| 1,940,297 | 12/1933 | Diamond | 474/245 |
| 1,947,734 | 2/1934 | Perry | 474/214 |
| 2,266,688 | 12/1941 | Keller | 474/201 |
| 3,119,276 | 11/1961 | Pearson | 474/228 |
| 3,192,785 | 6/1965 | Pearson | 474/228 |
| 3,540,302 | 11/1970 | Bendall | 474/229 |
| 3,590,650 | 7/1971 | Rollins | 474/229 |
| 3,605,514 | 9/1971 | Mitchell | 474/229 |
| 4,198,814 | 4/1980 | Schoenick | 474/227 |
| 4,227,425 | 10/1980 | Bendall | 474/223 |
| 4,266,435 | 5/1981 | Bendall | 474/227 |
| 4,337,057 | 6/1982 | Horowitz | 474/242 |

FOREIGN PATENT DOCUMENTS

| 885091 | 12/1980 | Belgium . | |
| 149521 | 5/1902 | Fed. Rep. of Germany . | |
| 318555 | 1/1920 | Fed. Rep. of Germany . | |
| 1184566 | 12/1964 | Fed. Rep. of Germany | 474/229 |
| 3032148 | 3/1981 | Fed. Rep. of Germany . | |
| 1224298 | 6/1960 | France . | |
| 1283629 | 12/1961 | France . | |
| 296760 | 12/1942 | Switzerland . | |
| 368035 | 4/1963 | Switzerland . | |
| 14291 | 7/1909 | United Kingdom . | |
| 187039 | 10/1922 | United Kingdom . | |
| 777958 | 7/1957 | United Kingdom | 474/247 |
| 1099213 | 1/1968 | United Kingdom . | |
| 2059004 | 4/1981 | United Kingdom . | |
| 2071806 | 9/1981 | United Kingdom . | |

Primary Examiner—Leslie A. Braun
Assistant Examiner—Dwight G. Diehl
Attorney, Agent, or Firm—Ostrolenk, Faber, Gerb & Soffen

[57] ABSTRACT

A transmission chain for a conical disk transmission with intercoupled links receiving link pins of which the end surfaces bear against the disks, and in which the contact zones between the longitudinal sides of the pins and the links are shorter than the upright sides of the link openings and offset in longitudinal direction of the links with respect to the ends of these sides.

20 Claims, 20 Drawing Figures

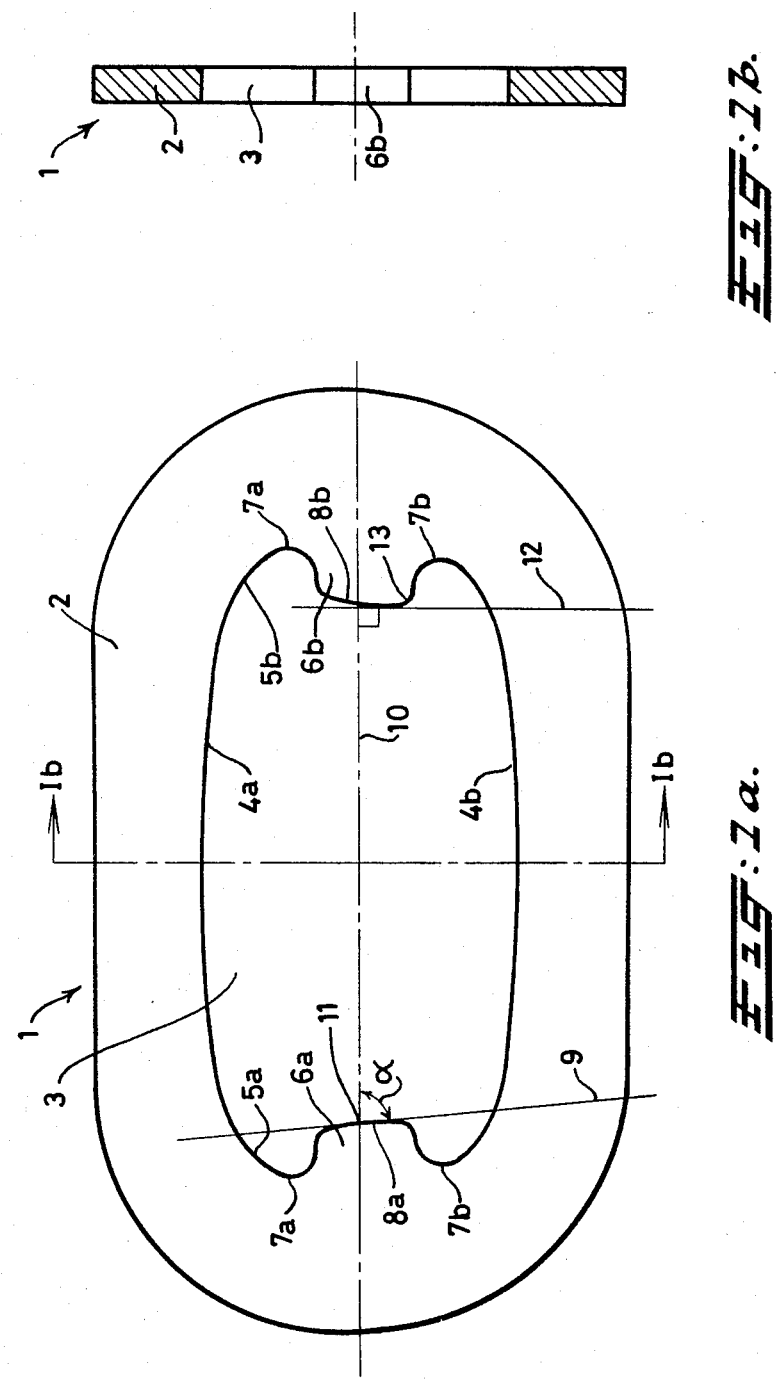

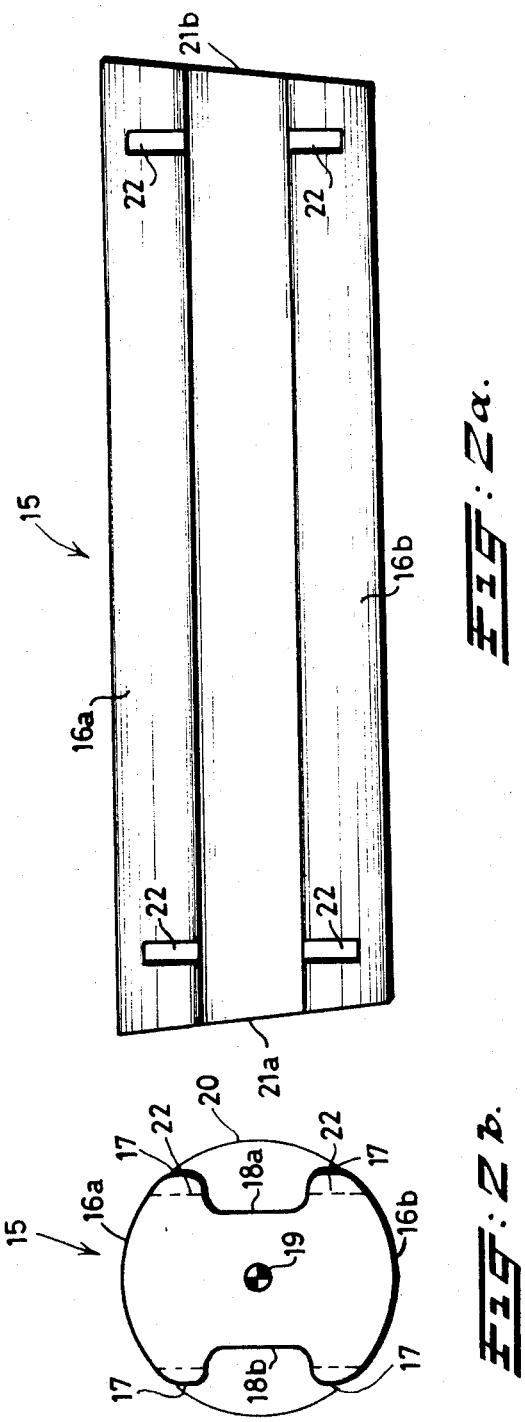

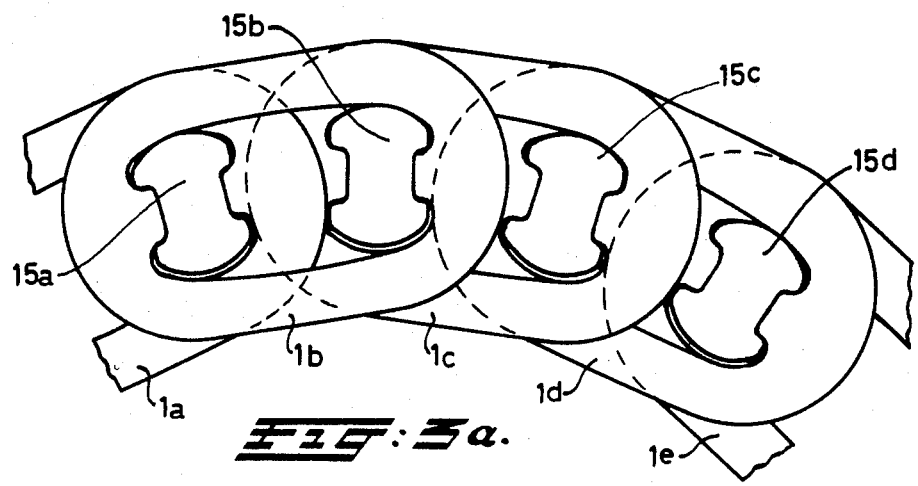
FIG: 3a.
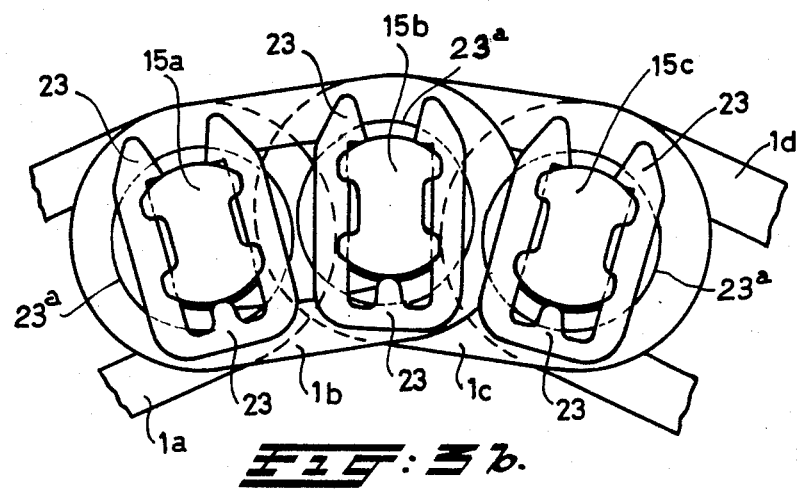
FIG: 3b.

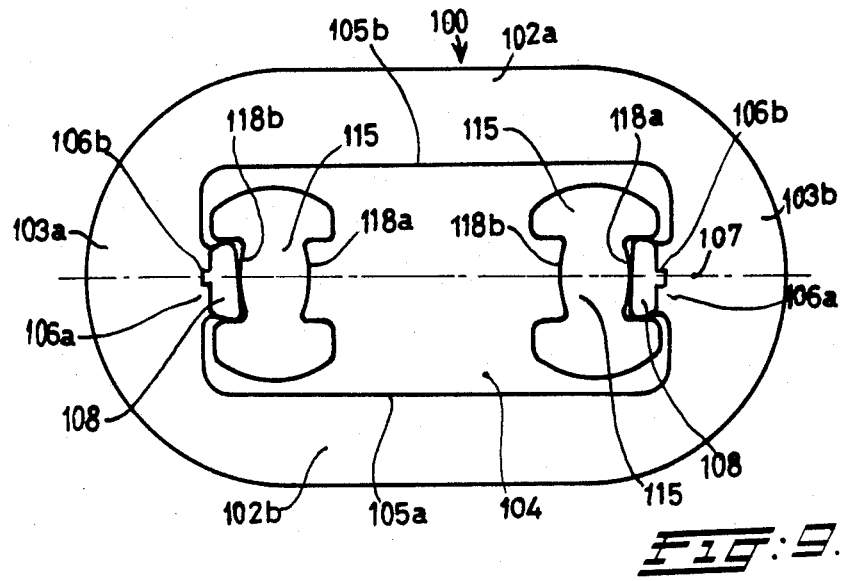
FIG: 9.
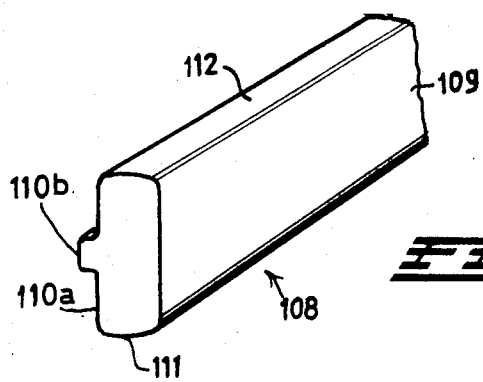
FIG: 10.
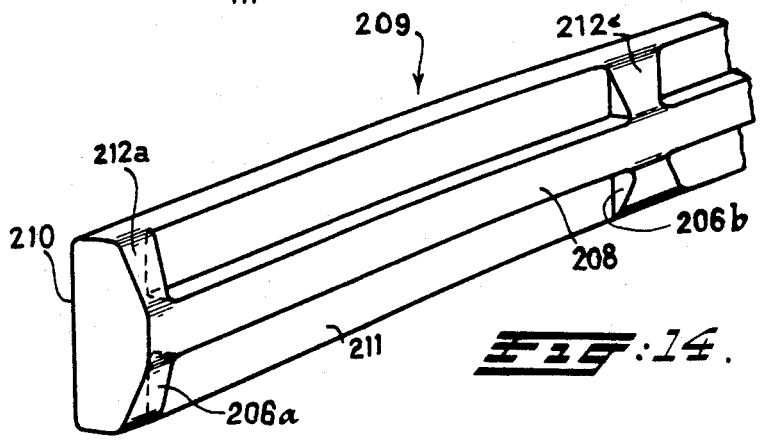
FIG: 14.

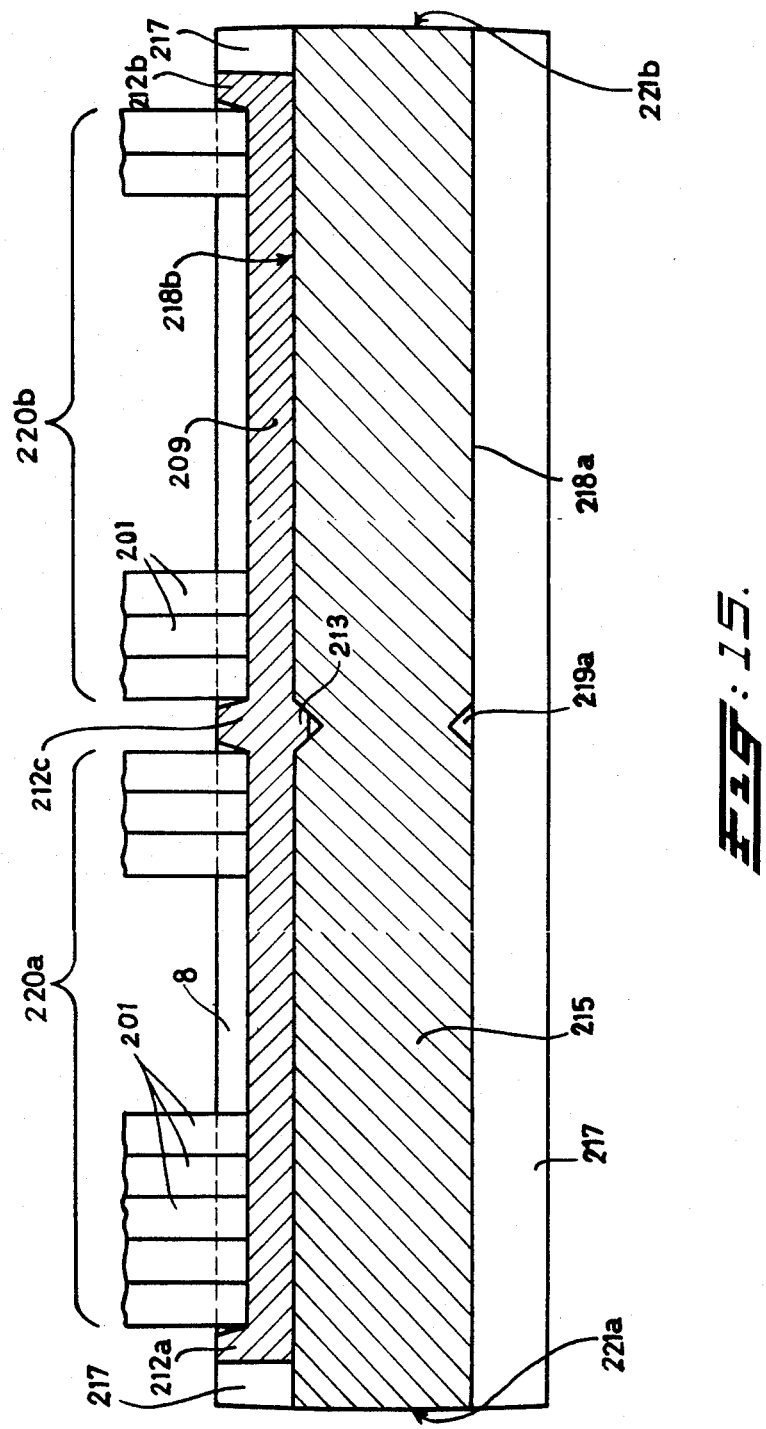

TRANSMISSION CHAIN

BACKGROUND OF THE INVENTION

1. Field of the Invention

This invention relates to a transmission chain for a conical disk transmission comprising a plurality of intercoupled links each receiving two hinge pins which are situated transversely to the link plane and extend through link apertures, and whose end surfaces co-operate, as frictional surfaces, with the conical surfaces, and whose longitudinal sides form surfaces for rolling contact, having a radius of curvature differing from that of the co-operating rolling-contact surface.

2. Description of the Prior Art

This transmission chain, which is already a considerable improvement with respect to the prior art as disclosed in applicants' U.S. Pat. No. 4,337,057, issued June 29, 1982 and assigned to the present assignee, is particularly suited for higher powers up to e.g. a thousand kW and more. Although of course when used for smaller powers the efficiency of the transmission is an important factor, this efficiency gains in importance when greater powers have to be transmitted, as every improvement of the efficiency, however small it may be, leads to a significant reduction of the heat generated in the transmission. So if, e.g., a power of about 2000 kW must be transmitted, an improvement of the efficiency of 0.5% results in a decrease of the heat generated of 10 kW.

A first factor which results in losses is the movement of the pins with respect to the surface of the link openings with which they co-operate. Such a movement occurs when the links enter between the conical disks, and when they leave them. It would be desirable to have a pure rolling movement of the co-operating surfaces of pins and links with respect to each other; only then would very little heat be generated. When, however, the pins slide with respect to the surfaces of the links, friction losses occur which result in a decrease of efficiency and consequently the generation of heat. The nature of a rolling movement of a first curved body over a lesser curved plain of a second body requires that in each of the final positions of the first body there must always be some space between the two bodies in the opposite other final position. In the transmission chain according to the abovementioned prior art this is not the case so that the co-operating surfaces of the two parts do not move in a purely rolling movement over each other but also slide with respect to each other; it is clear that such a sliding movement must be limited as much as possible.

The known transmission chain uses links of which the openings have straight boundaries; when the transitions between the edges of the openings have a small radius of curvature there are significant concentrations of mechanical stresses in these transitions which quickly lead to fatique cracks. Preferably the links and pins will have the configuration shown in FIG. 11 of the abovementioned U.S. Pat. No. 4,337,057, thus having transitions and rounded parts with a large radius of curvature. However, this has as a result that the fixation of the position of the pins in a direction perpendicular to the direction of movement of the chain occurs in points which lie relatively far from the rolling surfaces of the link openings, which results in the fact that the play between the links and the pins, necessary for the rolling movement over each other, is increased and this again leads to an increase of the distance over which the parts can glide with respect to each other.

SUMMARY OF THE INVENTION

The present invention aims to provide measures with which a significant improvement of a transmission of the above kind is obtained when the fixation of the pins with respect to the links in the direction in which the rolling movement takes place occurs at a place which lies, as seen in the longitudinal direction of the links, very close to the surface over which the parts roll over each other so that mutual movements can be closely controlled.

According to the invention this is achieved in that the contact zones in the upright sides of a link aperture, with the respective oppositely situated sides of the hinge pins, are shorter than the upright sides and are offset in the longitudinal direction of the link with respect to the ends of said sides, which thus form first and second opposite spaced apart end sections, with an offset central side section between them on both the link and the pin.

This measure results in a significant better fixation of the pins in the direction of the rolling movement; a slidable movement of the parts with respect to each other is only necessary over a small distance. Thus the losses which go with this sliding movement are correspondingly smaller and the efficiency of the transmission increases.

In a preferred embodiment the contact zone lies in each of the upright sides of the link aperture in a projecting portion which is directed toward the centre of the aperture and the boundary of which fits in a corresponding recess formed in the longitudinal side of a hinge pin co-operating therewith.

The most heavily stressed parts of the material are the transitions between the curved edge of the protruding part to upper and lower edge thereof; due to the above measures there is sufficient material present to prevent overloading of the material of the link.

Preferably the boundary of the projecting portion is cylindrically curved.

It is further advantageous when tangential planes to the projection edges through the points of intersection thereof with the longitudinal center line of the link include with said line an angle of less than 90° and the tangential planes to the inwardly situated ends thereof are perpendicular to said longitudinal center line.

In this embodiment the link is asymmetric with respect to its longitudinal axis and in operation during the movement of the links between the disks a force, directed to the axis of the disks, is exerted on the links; this force is opposite to the centrifugal force which also acts on the links, resulting in smoother running, less loading and smaller losses.

In a chain of the abovementioned kind, the co-operating surfaces are on the one hand the surface of the pin and on the other hand the opposite strip-shaped surfaces of the edges of the openings in the thin links. When such a chain is used for large powers very high surface pressures occur with the possibility that the, normally present hydrodynamic lubrication between the co-operating surfaces is lost, as oil can escape in a sidewise direction. This results in increased wear. This wear is still more increased when the links are not exactly perpendicular to the longitudinal direction of the pins resulting in edge loading as the sharp edge of the link bears upon the pin surface.

The invention aims to obviate this drawback with simple means. According to the invention an intermediate member is inserted between each hinge pin, on the one hand, and the oppositely situated upright aperture sides of a plurality of adjacent links on the other hand, the first longitudinal side of said intermediate member being coupled to the link aperture sides and the oppositely situated second longitudinal side forms the rolling contact-surface co-operating with the pin longitudinal side.

While retaining the cheap structure of the chain with identical links from sheet material which can take up great loads the important advantage is obtained that the individual surfaces by means of which the forces are transmitted between the adjacent links on the one hand and the side surface of a link pin on the other hand are now replaced by a limited number of adjacent rolling surfaces of significant larger surface, formed by the sides of the intermediate members directed to the link pins. These intermediate members do not move with respect to the links on which they are supported so that the rolling movement of the link pins takes place exclusively between the longitudinal surfaces of the pin and the surface of the intermediate members directed to the center of the link opening. This situation closely resembles the one which occurs between the surfaces of the teeth of teeth-wheels in which, as is known in itself, when sufficient lubrication is present, elasto-hydrodynamic lubrication is present resulting in very little wear. There is, of course, no edge loading.

The surfaces which roll over each other exert a kind of pumping action on the oil in the transmission; when the surfaces move away from each other the space thus created fills with oil which guarantees an excellent lubrication.

Preferably the intermediate members project into the respective link apertures and are enclosed on either side by a head portion of a hinge pin with a narrowed central portion.

Preferably the recesses in the pin are formed with parallel walls and transition to the head parts are symmetrical with respect to both the longitudinal and the transverse central planes of the pin, while the two head surfaces of the pin coincide with a circumscribed circle.

Furthermore an embodiment is possible in which a recess is formed in each of the upright sides of a link opening for accommodating an intermediate member of U-shaped cross-section of which the short transverse links define enclosing surfaces for the longitudinal side of a pin which performs a rolling movement over the member surface.

Each intermediate member is held immovably on the links by means of at least one rib, projecting from the backside thereof which is directed to the links.

In a chain as the present one care must be taken that the links cannot move over the pins in the longitudinal direction thereof.

It is possible to obtain this by providing circlips in grooves near the ends of the pins which lock the links against sideways movement.

However, the necessary grooves in the pin weaken the pins and can lead to fatigue cracks; furthermore these grooves complicate the fabrication of the pins.

A further drawback is that the presence of locking clips increases the minimum distance between the pin end and the first link; during operation bending couples are exerted on the pins and such a bending couple will be greater when said distance is greater so that it is of advantage to have this distance as small as possible.

According to the invention the locking clips and therewith the grooves for accommodating them can be omitted in that the part of the first longitudinal side coupled with the link aperture sides terminates at a distance from the two intermediate member ends to form an enclosure portion which projects to past at least a part of the contact surface between the link aperture side and the intermediate member, and each hinge pin together with the co-operating intermediate member is secured against relative displacement in the longitudinal direction, at least during operation.

A small change in the shape of the intermediate members which has no significant influence upon the price thereof results in a simple way in a good enclosing of the links on the intermediate pieces; as the intermediate member cannot move in the longitudinal direction of the pin with which it co-operates, the links are also locked with respect to the pin.

Further an embodiment is possible in which one or more enclosure portions projecting to past at least a part of the contact surface are provided between the two intermediate member ends.

This measure makes it possible to divide the links in a simple way into two or more groups; such a division into groups is already known from the abovementioned publications.

According to the invention the efficiency of a transmission provided with a chain according to this application can be further increased by decreasing the friction losses when the end surfaces of the pins, as seen in a direction transverse to the direction of movement, are at least partially curved. This results in a better contact with the flat disk surfaces when the pin, during its introduction between the disks, bends slightly.

Preferably the end surfaces are at least rounded near the longitudinal sides of the pins.

This results in a decrease of the losses which occur when the pins enter between the disks with a slightly sliding movement as a result of the fact that the respective pin ends do not enter into contact with a disk surface at the same moment.

As a result of the abovementioned measures the efficiency of a transmission chain according to the invention nearly equals the efficiency of a good gearbox with teethwheels.

The features of the present invention which are believed to be novel are set forth with particularity in the appended claims.

Other claims and many of the attendant advantages will be more readily appreciated as the same become better understood by reference of the following detailed description and considered in connection with the accompanying drawings in which like reference symbols designate like parts throughout the figures.

DESCRIPTION OF THE DRAWINGS

FIG. 1a is a side view of a link element as used in the transmission chain according to the invention;

FIG. 1b is a cross-section of such a link;

FIG. 2a is a side view of a hinge pin used in a link according to FIG. 1;

FIG. 2b is an end view of a hinge pin of this kind;

FIG. 3a is the combination of a number of links and pins to form part of a transmission chain according to the invention;

FIG. 3b is a corresponding side view with the circlips fitted to the pin ends;

FIG. 9 is a view of combination of a single link with two associated pins.

FIG. 10 is a view of an intermediate member.

FIG. 14 is a view showing a rolling contact intermediate member.

FIG. 15 is a longitudinal sectional view of a hinge pin.

DESCRIPTION OF THE PREFERRED EMBODIMENTS

Figure 4:
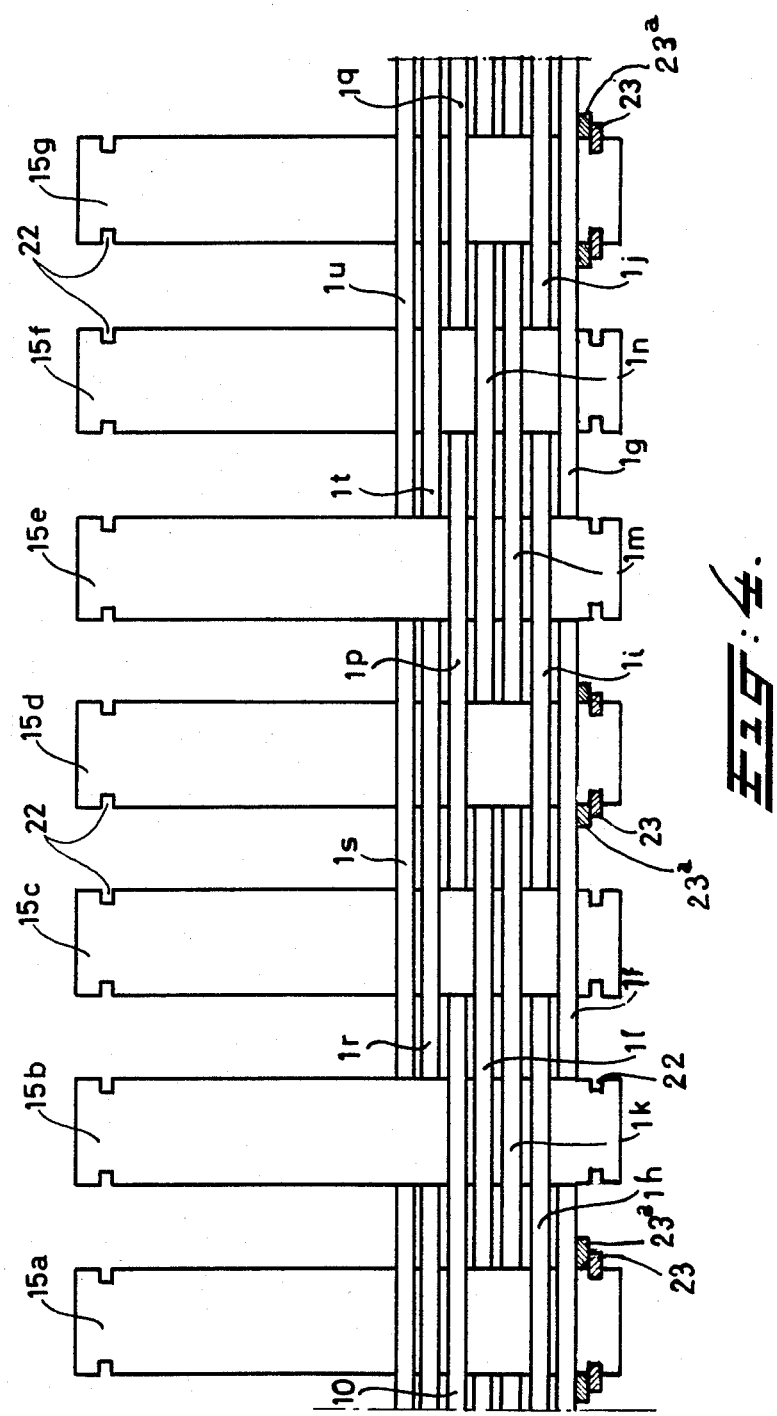
FIG. 4 is a top plan view of a part of a complete transmission chain.

The transmission chain according to the invention is of the type described in U.S. Pat. No. 4,337,057, and is intended, more particularly, for use in a continuously variable transmission with conical disks. In a transmission of this kind, two pins are always accomodated in one link, their side surfaces co-operating with the upright boundaries of the apertures in the link and their ends being clamped between the conical disks as the chain enters the same. In a chain of this kind the power is transmitted by tension.

When the pins of a transmission chain of this kind are clamped between the conical disks after entering the same, the position of the pin end faces with respect to the conical disks while describing the traversed arc, undergoes hardly any change, while the position of the links with respect to the pins does change of course; this means that the side surfaces of the pins and the upright edge boundaries of the apertures move with respect to one another and this movement will, preferably, have to be a purely rolling movement in order to minimize the losses. In order to allow a pure rolling movement, however, there would necessarily have to be play in the direction of the rolling surfaces, but such play also gives the pin surfaces the opportunity of sliding relatively to one another, and it has been found in practice that this is a source of heat generation and losses. This patent application is concerned with steps whereby the losses occurring in a transmission provided with a chain of this kind are minimized so that the efficiency of the transmission will be as high as possible.

Various link and pin configurations whereby this effect is achieved will be described hereinafter; FIGS. 1 to 6 relate to embodiments in which, generally speaking, the link apertures are provided with projections extending toward the center and the pin side surfaces are formed with corresponding recesses; FIG. 7 relates to an embodiment in which the link aperture boundaries are formed with recesses and the pins have projecting portions.

FIG. 1a shows a link 1 comprising a web 2 and aperture 3. Aperture 3 is defined by the two longitudinal edges 4a, 4b and the transverse boundaries 5a, 5b. Each transverse boundary 5a, 5b is constructed with a projecting portion 6a, 6b directed toward the centre of the aperture 3 and merging into the longitudinal edges 4a, 4b via the transitions 7a, 7b. The outermost boundary 8a and 8b of the projections 6a, 6b is cylindrically curved transversely of the drawing plane with a shape such, that a tangential plane 9 (shown only in the case of the left-hand projection 6a) through the point of intersection 11 with the longitudinal axis 10 includes an acute angle α with the longitudinal axis 10 of the link while a tangential plane 12 to the bottom corner 13 of a projection (shown only in the case of the projection 6b) is at a right angle to the said line 10.

The pin co-operating with links of this shape is shown in side elevation in FIG. 2a and in end elevation in FIG. 2b. The pin is denoted by reference 15 and when viewed in cross-section, comprises two head surfaces 16a, 16b merging, via the curved transitions 17, into the parallel longitudinal surfaces 18a, 18b. As shown more particularly in FIG. 2b, the pin is symmetrical in cross-section with respect to the center-point 19 and the head surfaces 16a, 16b fall on or inside a circle, the center-point of which coincides with point 19. The end faces 21a, 21b are shown as flat end faces in FIGS. 2a, 2b but another possible configuration of these end faces will be discussed in detail hereinafter.

Near the end faces, the transitional portions 17 are formed with slots 22 to receive a circlip, which will be discussed hereinafter.

FIG. 3a is a side elevation of a number of pins 15a-15d together with the co-operating links 1a-1e. FIG. 3b is a similar side view but with the circlips 23 now fitted. The latter are of a somewhat curved construction and so fitted into the slots that they press the links against one another.

This figure shows the flat washers 23a, inserted between the circlips 23 and the various links.

FIG. 4 is a top plan view of a portion of the transmission chain constructed with the links and pins shown in FIGS. 1 and 2.

It should be noted that for the sake of clarity the links are shown spaced apart in the transverse direction of the chain. In actual fact, however, they abut one another and may be divided into two groups pre-stressed by spring elements.

Moreover, not all the links need have the same thickness; for example, a different link thickness can be provided for a group of three layers provided that the overall construction is symmetrical. Each of the pins 15a-15h is provided, near the end faces, with a circlip 23, some of which are shown in the drawing. The links are disposed in a regular pattern around the pins as follows:

The links 1f, 1g of the first row situated near the bottom ends of the pins comprise the two pins 15c, 15d, on the one hand, and 15f, 15g, on the other. In the second row of links, which are offset from the links of the first row, the link 1h comprises the pins 15a and 15b, link 1i comprises the pins 15d, 15e and link 1j the pins 15g and 15h. Two rows of correspondingly oriented links then follow, of which the links 1k and 1l comprise the pins 15b and 15c and the links 1m and 1n comprise the links 15e and 15f. There then follows a row of links 1o, 1p and 1q oriented to correspond to the links 1h, 1i and 1j; the links 1r-1u in the rows situated thereafter are again oriented in accordance with the links 1f and 1g of the first row. This construction corresponds to the construction explained with reference to FIG. 4 of U.S. Pat. No. 4,337,057.

Figure 5A:
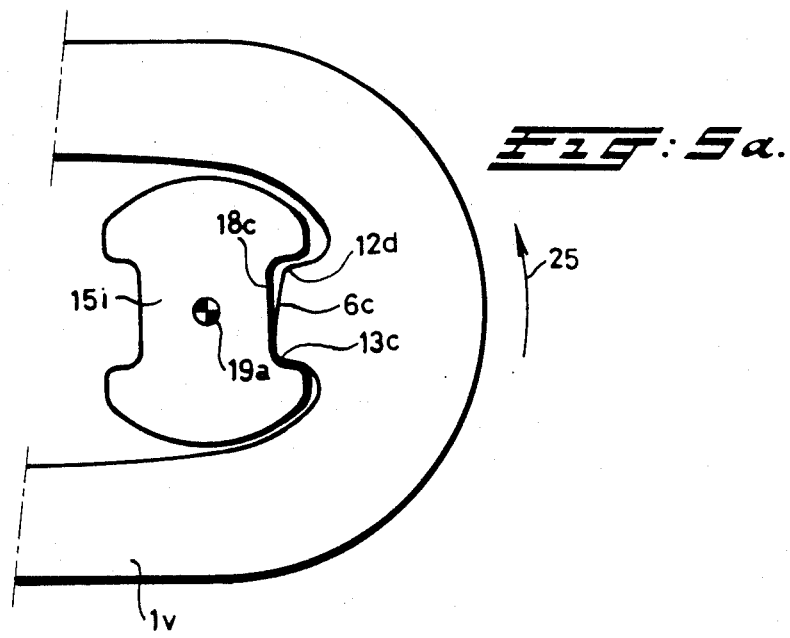
FIGS. 5a-b show the rolling of the co-operating pin and links surfaces.
Figure 5B:
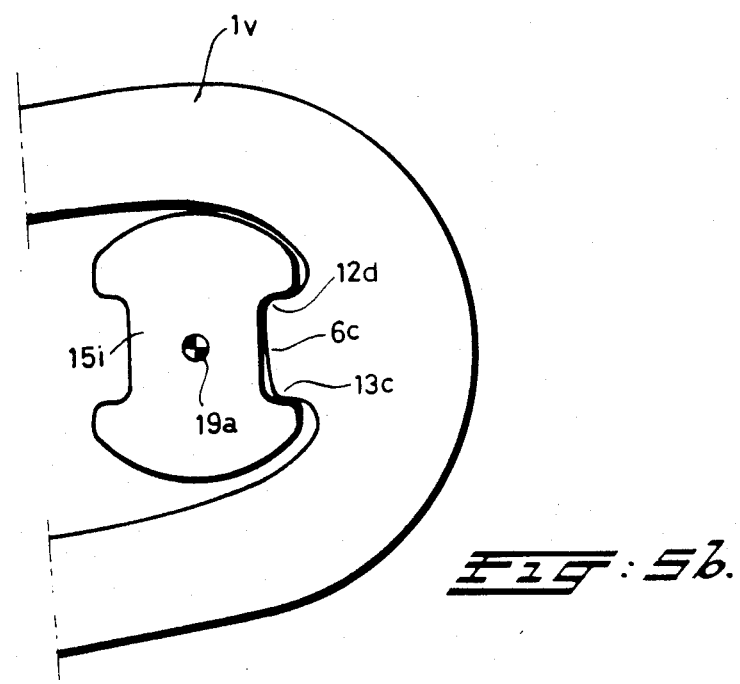

FIGS. 5a and 5b illustrate the rolling of the co-operating pin and hinge surfaces; a pin and a portion of a link is shown in each case. The link is indicated by reference 1v and the pin by reference 15i; it is assumed that the link moves in the direction of the arrow 25 with respect to the pin. Favorable operation depends on the co-operating parts being well enclosed in the transverse direction of the pin in order to avoid uncontrolled slipping of these parts with respect to one another.

FIG. 5a shows the situation before entering between the conical disks; the center 19a of the pin 15i is not yet clamped between said disks. The relative positions of the pin and link are as shown in FIG. 5a: The bottom corner 13c of projection 6 rests against the bottom edge of the flat side 18c of the pin because the tangent to that corner 13c is perpendicular to the longitudinal axis of the link as already explained with reference to FIG. 1a.

The situation shown in FIG. 5b gradually occurs after the pin has been clamped between the conical disks. The co-operating surfaces of the hinge and pin have carried out and completed a controlled combined rolling and sliding movement with respect to one another; the top corner 12d of the projection 6c now rests against the top edge of the surface 18c. This combined movement takes place through an angular rotation corresponding approximately to one chain pitch. On leaving the conical disks the relative movements between the link and the pin take place in the opposite direction.

It will be apparent from the foregoing that the configuration according to the invention results in the pin being enclosed very satisfactorily in the hinge projection, and this prevents uncontrolled slipping of the surfaces on one another and allows a combined rolling and sliding movement.

In the situation shown in FIG. 5b, the pins exert an inwardly directed force on the links in opposition to the centrifugal force exerted on the links. This has a favorable influence on friction and wear between the link and pin respectively.

Figure 6:
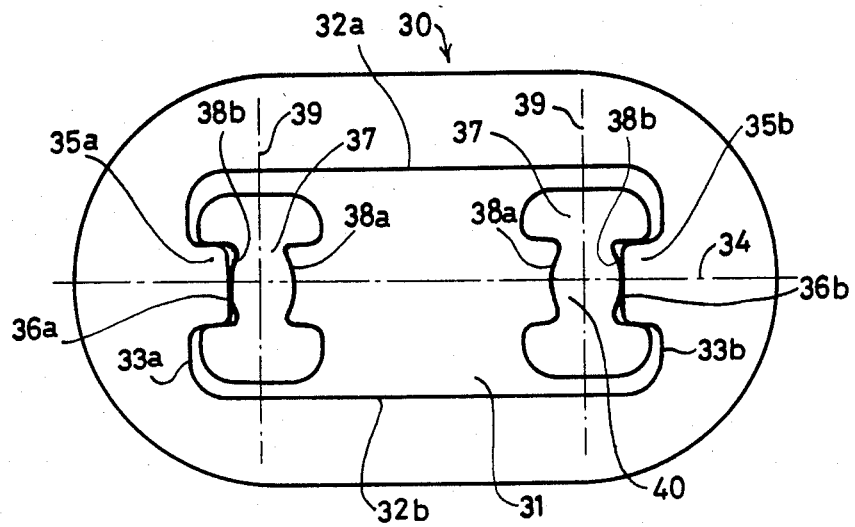
FIG. 6 is a side view of another embodiment of a link with the pins used for the same.
Figure 7:
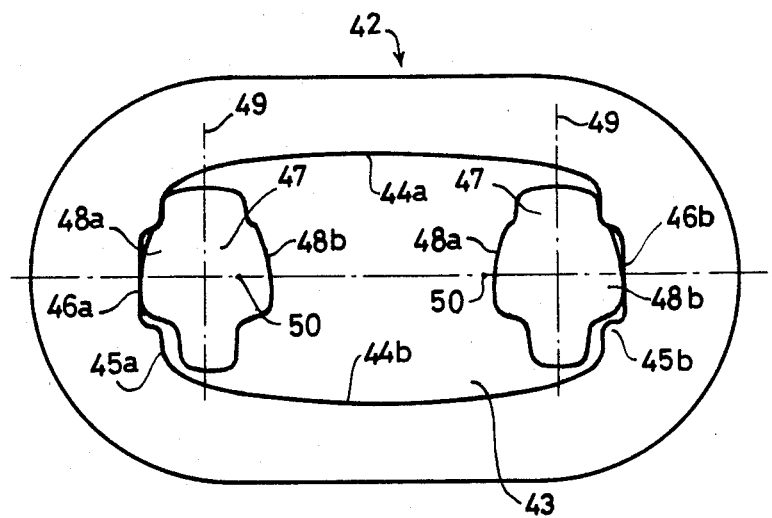
FIG. 7 is a side view of an embodiment of a link and pin in which the link is formed with recesses and the pin with projections.

FIG. 6 is a side view of another possible embodiment of link and pins. According to this embodiment, the link 30 is formed with an aperture 31 with parallel longitudinal edges 32a, 32b and upright edges 33a, 33b, the projection 35a, 35b which is, for example, symmetrical with respect to the link longitudinal axis 34, being formed thereon via curved transitions. The projections 35a, 35b have straight edge boundaries 36a. The side faces 38a, 38b of the pins 37 are cylindrically curved; as shown in the Figure, each of the pins is symmetrical with respect to the longitudinal central plane 39 but asymmetrical with respect to the transverse central plane, the object of this being to obtain forces perpendicular to the plane of contact between the pin and the link in every position.

FIG. 7 is a side elevation of an embodiment in which the link is formed with recesses and the pin with projecting side face portions. Link 42 has an aperture 43 with curved longitudinal edges 44a, 44b and upright transverse edges 45a, 45b, the center portion 46a, 46b of which is re-entrant with a straight edge. Link 42 co-operates with pins 47 whose side faces are provided with a projecting portion 48a, 48b which is cylindrically curved, symmetrically with respect to the pin longitudinal plane 49. The pin is asymmetrical with respect to the transverse plane 50 thereof, and this is again in order to produce forces perpendicular to the contact plane.

Figure 8A:
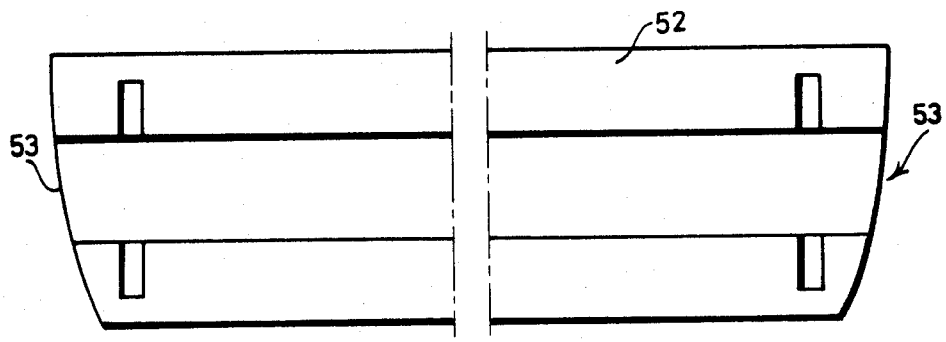
FIG. 8a is a side view of a preferred embodiment of a pin used according to the invention.
Figure 8B:
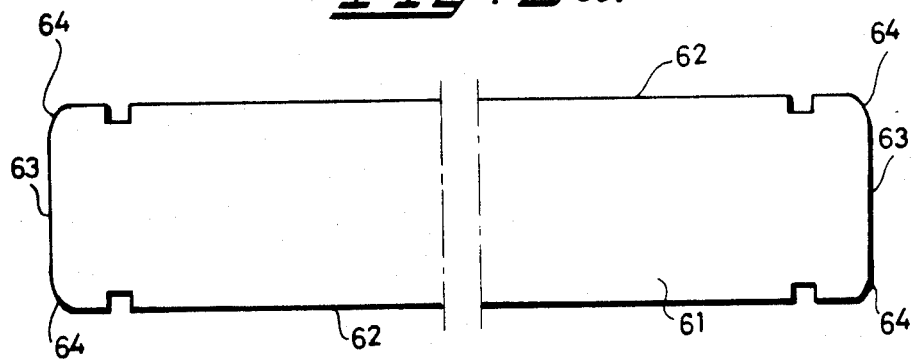
FIG. 8b is a top plan view of a preferred embodiment of the pin configuration.

In the context of the object of the invention, i.e. to improve the efficiency of a transmission equipped with a chain according to the invention, the invention also proposes a number of steps which are explained with reference to FIGS. 8a and 8b. The following will serve in explanation thereof:

When a pin of a transmission chain of the kind in question enters between two conical disks, the pin experiences forces which result in its bending, inter alia, in a direction toward the center of the conical disks. If the pin end faces are made flat, this bending will have the effect that the pin can no longer bear over the entire surface under all loading conditions, so that edge loading is inevitable and this is of course unfavorable and results in wear. The invention obviates this. FIG. 8a shows an embodiment wherein the pin 52 is provided with end faces 53 which are cylindrically curved somewhat transversely of the longitudinal axis of the pin. Edge loading can be avoided in this way.

Another source of losses is if the pins enter between the conical disks in an offset relationship in the longitudinal direction of the pins. This results in first one pin end and then the other pin end coming into contact with a conical surface. During the initial phase of this movement the transition between the pin end face and the pin longitudinal face scrapes along the conical surface. Here again friction and wear occur and an attempt should preferably be made to obviate this. FIG. 8b is a top plan view of a pin 61 in which the transitions between the pin side faces 62 and the pin end faces 63 are beveled as shown at 64.

In the above described embodiments the co-operating rolling-contact surfaces are formed, on the one hand, by surface portions of the pins and, on the other hand, the respectively oppositely situated strip-shaped surfaces formed by the edges of the link apertures. Under heavy loading this has the result that the oil used to lubricate the chain (the chains run completely in an oil bath or are pressure lubricated) is forced away between the co-operating surfaces so that no lubrication takes place; there is also the possibility of edge loading if the link surface is not exactly perpendicular to the longitudinal direction of the pin.

These problems are solved by using intermediate members, inserted between the links and the pins and locked against transverse movement with respect to the links.

FIG. 9 shows the combination of a single link of a chain according to the invention with two associated pins. The link is denoted as a unit by reference 100 and consists of the two long sides 102a, 102b the first and second opposite head ends 103a, 103b and a single central aperture 104. Aperture 104 is bounded by the long edges 105a, 105b and the upright edges 106a. In each of the edges 106a is a recess 106b to accommodate a corresponding rib on the intermediate member 108.

Such an intermediate member overlaps a number of links disposed in adjacent relationship in the transverse direction of the chain, as will be explained in detail hereinafter.

FIG. 10 shows this intermediate member in perspective. On one side it has a substantially flat longitudinal side 109 which forms the rolling contact surface, which co-operates with the hinge pins received in the link; on the other flat side 110a the rib 110b is formed.

The configuration is such that the intermediate members 108 are immovably on the surface 106a of the adjacent links.

Figure 11:
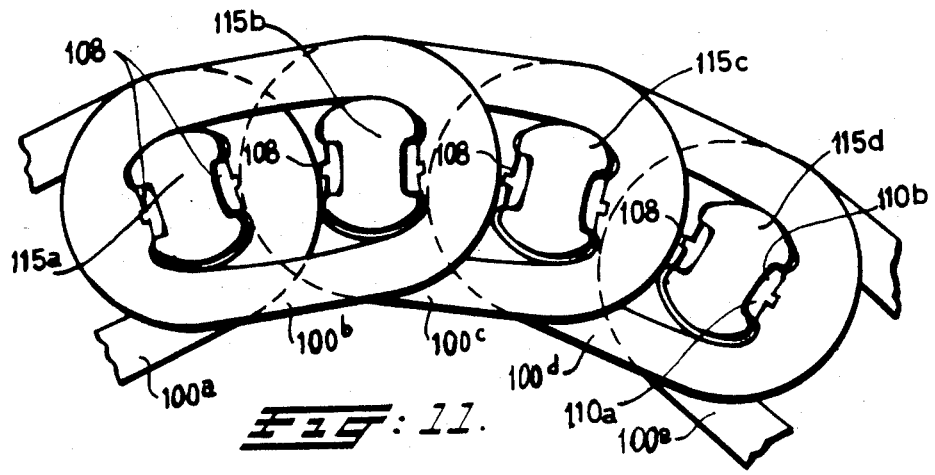
FIG. 11 is a side elevation view of a number of pins.

FIG. 11 is a side elevation of a number of pins 115a–115d together with the links 100a–100e co-operating therewith.

This figure clearly shows how the rolling-contact intermediate members 108 with the ribs 110b remain immovably on the link aperture edges 106a with the recesses 106b, the rolling movement taking place between the longitudinal surfaces of the pins and the surfaces 109 of the intermediate members. The resulting situation is comparable to that which occurs with gear flanks rolling over one another and the circumstances under which lubrication takes place between the surfaces rolling on one another are such as to give the required elastohydrodynamic lubrication coupled with negligible wear and very high efficiency.

Figure 12:
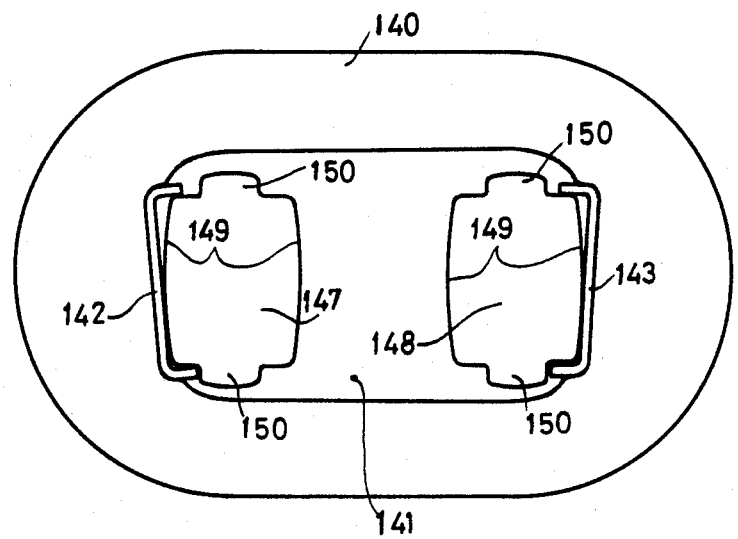
FIG. 12 is another embodiment of the invention utilizing U-shaped intermediate members.
Figure 13:
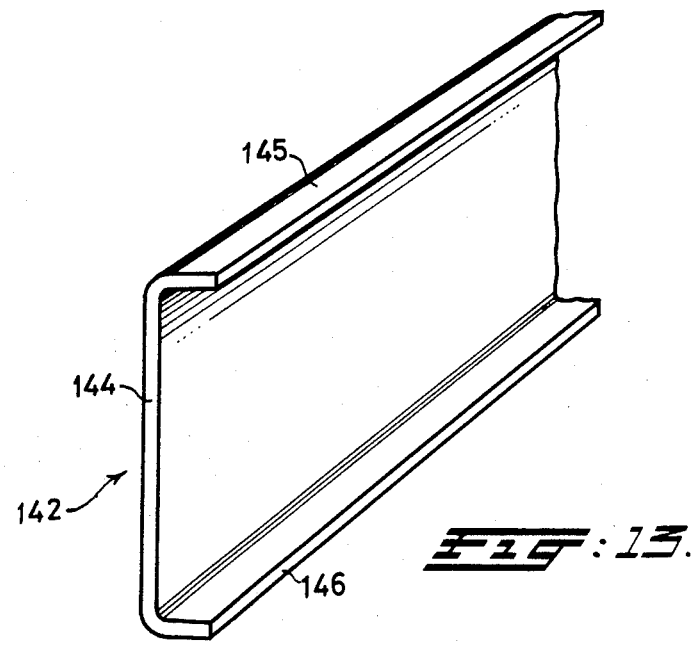
FIG. 13 is a view of a U-shaped intermediate member of FIG. 12.

FIG. 12 illustrates an embodiment with links 140 in which the rolling-contact intermediate members received in the upright sides of the link aperture 141 and denoted by references 142, 143 are of U-shaped section with (see FIG. 13) a relatively long transverse leg 144 and short upright sides 145, 146. They co-operate with pins 147, 148 each having cylindrical curved, rolling longitudinal sides 149 merging into narrower head parts 150. Just as in the case of the embodiment described hereinbefore, the shape of the rolling-contact intermediate members and the co-operating pin longitudinal sides ensures good lubrication of the pins, resulting in a higher efficiency of the transmission provided with such a chain.

In the above described embodiments the links are kept on the intermediate members by the circlips on the pins, with washers between the clips and the links. It is possible to shape the members such that the circlips can be omitted.

FIG. 14 is a perspective of such a rolling-contact intermediate member. On one side it has a substantially flat longitudinal side 210 which forms the rolling-contact surface co-operating with the hinge pins received in the link, and on the other side it has the surface 211 with the rib 208; this configuration is such that the forces exerted on the surface 210 hold the intermediate members 209 immovable.

According to the invention, enclosure portions project from the contact surface 211 of the intermediate member 209 and the links co-operating therewith, at least at the two ends of said intermediate member; those which are situated near the two ends are indicated by references 212a and 212b. The drawings illustrate an embodiment in which a third enclosure portion 212c is formed in the middle of the intermediate member 209. The links are enclosed by the longitudinal edges 206a, 206b between these enclosure portions (212a, 212c on the one hand, 212c, 212b on the other hand), so that they cannot move in the longitudinal direction of the intermediate member 209. In order to prevent displacement in the longitudinal direction of an intermediate member with respect to the hinge pins co-operating therewith, each intermediate member 209 is also provided with a locking portion 213, shown in FIG. 15, projecting from the surface 210 co-operating with the hinge pin, said portion 213 fitting in a corresponding recess 219a, 219b formed in the rolling-contact surfaces 218a, 218b of each hinge pin. Instead of a locking portion 213 formed integrally with the intermediate member, it is possible to use a separate insert 214.

FIG. 15 is a longitudinal section of a hinge pin 215 with an intermediate member co-operating therewith and resting against the longitudinal side 218b; of course the side 218a will also co-operate with an intermediate member of this kind in a complete chain. The links 201 only a portion of which is shown, are divided up into two groups 220a, 220b respectively enclosed between the enclosure portions 212a, 212c, on the one hand, and 212c, 212b on the other hand; a subdivision into groups of this kind has certain advantages and can be embodied very easily with the steps according to the invention without the need for intermediate members. If subdivision into more than two groups is required then correspondingly more enclosure portions are provided on the intermediate members.

As a result of the absence of circlips, the distance between the outermost link of a set and the adjacent head surface can be smaller, resulting in less flexural loading of the pin; the absence of receiving grooves for the circlips naturally increases the strength and particularly the pin resistance to fatigue fracture. The chain assembly is simplified since the sets of links and intermediate members can be combined to cohesive units beforehand.

Although it is essential that one link should always co-operate with two hinge pins, it is not essential for only a single aperture to be formed in the link; the link may have a "bridge" by which the single aperture in the abovedescribed embodiment is divided into two separate apertures.

The steps proposed according to the invention, more particularly the special configuration of the co-operating pin and link surfaces, have the effect that a transmission provided with a chain according to the invention has an efficiency which approaches the efficiency of a good gearwheel transmission; transmissions of this kind can be constructed to transmit very considerable power without the heat generation resulting in problems in connection with cooling and heat dissipation: the heat generated during operation can readily be dissipated just as in gearboxes. Moreover, transmission chains of the type described hereinbefore can be so designed as to traverse a very small radius, and this means a very wide range of transmission ratios can be obtained, of which the maximum transmission ratio can be at least six times greater than the lowest.

This wide possible range, together with the extremely favorable efficiency, makes the transmission extremely suitable for use in vehicles.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A transmission chain comprising:
    a plurality of link units each having first and second opposite end portions for intercoupling to adjacent link units, the end portions of each link unit being spaced apart in a link longitudinal direction, each link unit end portion having a respective surface facing toward and spaced apart from the respective surface of the other end portion of that link unit, each end portion surface including first and second opposite spaced apart end sections and a respective contact surface section between the first and second end sections, the contact surface section being offset from the end sections in the link longitudinal direction; and a plurality of pins, each pin having first and second opposite side surfaces extending in a pin longitudinal direction transverse to the link longitudinal direction, each pin side surface including first and second opposite spaced apart end sections and a central side section between the first and second end sections, the central side section being offset from the end sections in the link longitudinal direction; the central side section of the first side surface of each pin being shaped for rolling engagement against the respective contact surface section of the first end portion of a corresponding first one of the link units, the central side section of the second side surface of that pin being shaped for rolling engagement against the respective contact surface section of the second end portion of an adjacent corresponding second one of the link units;

at the rolling engagement between one of the central side sections of one of the pins and the respective contact surface section of the corresponding one of the link unit end portions, the central side section and the respective contact surface section each being offset in the link longitudinal direction for fitting one into the other and each having a radius of curvature which differs from the radius of curvature of the other.

2. The chain of claim 1 in which each pin further has first and second opposite end surfaces spaced apart in the pin longitudinal direction, each end surface being shaped for cooperating with a conical surface of a conical disk transmission.

3. The chain of claim 2 in which each of the first and second opposite end surfaces of each pin is at least partially curved generally in a direction perpendicular to both the link and pin longitudinal directions.

4. The chain of claim 2 in which each of the first and second opposite end surfaces of each pin is curved or beveled at least near the first and second side surfaces of the pin.

5. The chain of claim 1 in which the respective contact surface section of each end portion of each link unit is offset in the link longitudinal direction for projecting toward the respective contact surface section of the other end portion of that link unit, each pin having a first corresponding recess defined in the first side surface thereof for providing a respective central side section and a second corresponding recess defined in the second side surface thereof for providing a respective central side section, each respective contact surface section being shaped for fitting into the respective one of the corresponding recesses for rolling engagement with the respective central side section.

6. The chain of claim 5 in which each respective contact surface section is cylindrically curved.

7. The chain of claim 5 in which each link unit has a center line extending in the link longitudinal direction, the respective contact surface section of each end portion of the link unit having an inward end point situated toward the other end portion and on one side of the center line, each respective contact surface section further defining an intersection point with the center line, each contact section being shaped such that a plane tangent to the contact surface section at the intersection point forms an angle of less than 90° with the center line at the one side of the center line and a plane tangent to the contact surface section at the inward end point forms an angle of 90° with the center line.

8. The chain of claim 1 in which each link unit comprises:

a plurality of link members, each having first and second opposite link member end portions, the first and second end portions of each link member being spaced apart in the link longitudinal direction, the first link member end portions of the link members of each link unit together defining the first link unit end portion of that link unit, the second link member end portions of the link members of each link unit together defining the second link unit end portion of that link unit;

first and second intermediate members, the first intermediate member being positioned on the first link unit end portion for defining the respective contact surface section thereof, the second intermediate member being positioned on the second link unit end portion for defining the respective contact surface section thereof.

9. The chain of claim 8 in which each pin comprises first and second opposite head portions, the first side surface of the pin having a first recess defined therein between the first and second head portions, the second side surface of the pin having a second recess defined therein between the first and second head portions, the first and second recesses defining the respective central side section; each intermediate member projecting into a respective one of the recesses for being enclosed in the upright direction by the first and second head portions.

10. The chain of claim 9 in which each pin has an axis extending in the pin longitudinal direction, the first and second side surfaces, first and second recesses and first and second head portions of each pin being symmetrical about the axis of that pin.

11. The chain of claim 10 in which the first and second head portions of each pin define first and second head surfaces, the first and second head surfaces lying on a circle.

12. The chain of claim 8 in which each of the first and second intermediate members has a U-shaped cross section with two sides and a connecting leg connecting the two sides, the connecting leg defining the respective contact surface section, the two sides defining the respective first and second spaced apart end sections and being for enclosing the respective central side sections of the corresponding pin.

13. The chain of claim 8 in which each of the link unit end portions has defined therein a respective recess for holding one of the intermediate members, each of the intermediate members having a rib for being held in the respective recess.

14. The chain of claim 8 in which each of the intermediate members has first and second opposite ends spaced apart in the pin longitudinal direction, each intermediate member having a first enclosing portion disposed near the first opposite end and a second enclosing portion disposed near the second opposite end, the enclosing portions being for projecting toward the link unit end portion on which the intermediate member is positioned for preventing relative movement in the pin longitudinal direction between the intermediate member and the link members of the link unit.

15. The chain of claim 14 in which each intermediate member has at least one additional enclosing portion, the additional enclosing portion being between the first and second enclosing portions.

16. A chain comprising:
a plurality of link units including at least first and second adjacent link units each having a respective end portion for intercoupling to the other of the first and second adjacent link units, each of the first and second adjacent link units further having a respective aperture defined therein, each of the respective end portions having a respective surface facing generally toward the respective aperture; the respective end portion surfaces of the first and second link units facing generally toward each other when the link units are intercoupled; and
a pin in the respective apertures, the pin having a first side surface facing generally toward the respective end portion surface of the first link unit and a second side surface opposite the first side surface and facing generally toward the respective end portion surface of the second link unit; each side surface and the respective end portion surface which it faces being shaped for rolling engagement against each other, with one of the side surface and the respective end portion surface having a section projecting toward the other and with the other of the side surface and the end portion surface having a corresponding recess defined therein for cooperatively engaging the projecting section for controlling the slipping of the side surface and the end portion surface against each other.

17. The transmission chain of claim 16 in which each side surface of the pin has the projecting section and each of the respective end portion surfaces of the link units has the corresponding recess defined therein.

18. The transmission chain of claim 17 in which each of the first and second adjacent link units comprises:
a plurality of link members, each having an end section, the end sections of the link members of each link unit together defining the respective end portion of that link unit; and
an intermediate member on the respective end portion of the link unit, the intermediate member of the link unit having the corresponding recess defined therein for cooperatively engaging the projecting section on the facing pin side surface.

19. The transmission chain of claim 16 in which the respective end portion surface of each link unit has the projecting section and the facing side surface of the pin has the corresponding recess defined therein.

20. The transmission chain of claim 19 in which each of the first and second adjacent link units comprises:
a plurality of link members, each having an end section, the end sections of the link members of each link unit together defining the respective end portion of that link unit; and
an intermediate member on the respective end portion of the link unit, the intermediate member defining the projecting section of the respective end portion surface of the link unit.

* * * * *